United States Patent [19]

Jang

[11] Patent Number: 5,536,216
[45] Date of Patent: Jul. 16, 1996

[54] HYDRAULIC PRESSURE CONTROL SYSTEM OF AN AUTOMATIC TRANSMISSION FOR VEHICLE

[75] Inventor: Jaeduk Jang, Kyungki-do, Rep. of Korea

[73] Assignee: Hyundai Motor Company, Rep. of Korea

[21] Appl. No.: 360,357

[22] Filed: Dec. 21, 1994

[30] Foreign Application Priority Data

Dec. 24, 1993 [KR] Rep. of Korea ...................... 93-29691

[51] Int. Cl.[6] .................................................. F16H 61/04
[52] U.S. Cl. ............................................................ 475/123
[58] Field of Search .................................... 475/121, 122, 475/123

[56] References Cited

U.S. PATENT DOCUMENTS

| | | | |
|---|---|---|---|
| 5,211,082 | 5/1993 | Sasaki et al. | 475/122 |
| 5,301,572 | 4/1994 | Tanaka et al. | 475/123 |
| 5,376,056 | 12/1994 | Wakahara et al. | 475/123 |
| 5,383,820 | 1/1995 | Mori | 475/123 |
| 5,409,427 | 4/1995 | Mori et al. | 475/123 |

*Primary Examiner*—Dirk Wright
*Attorney, Agent, or Firm*—Finnegan, Henderson, Farabow, Garrett & Dunner

[57] ABSTRACT

The present invention provides a 4-speed transmission control system for a vehicle including a multiple stage gear mechanism receiving a driving force from an engine, a plurality of friction members for controlling a gear action of the gear mechanism, a hydraulic pressure control system for selectively applying and releasing the friction members in accordance with a vehicle speed, and a transmission control unit for controlling an operation of the hydraulic pressure control system, in which the hydraulic pressure control system has a first-to-second speed shift valve actuated in accordance with a second speed signal pressure and selectively applying more than one of the friction members, and a second-to-third speed shift valve actuated in accordance with a third speed signal pressure.

11 Claims, 8 Drawing Sheets

| RANGE | FRICTION MEMBERS | C1 | C2 | C3 | B1 | B2 | B3 | F1 | F2 | ENGINE BREAK |
|---|---|---|---|---|---|---|---|---|---|---|
| P | | | | | | | | | | |
| R | | ○ | | | | ○ | | | | ○ |
| N | | | | | | | | | | |
| D | 1 | | ○ | | | | | ○ | | X |
| D | 2 | | ○ | ○ | | | ○ | | ○ | X |
| D | 3 | | ○ | ○ | ○ | | ○ | | | ○ |
| D | 4 | | | | ○ | | ○ | | | ○ |
| 2 | 1 | | ○ | | | | | ○ | | X |
| 2 | 2 | | ○ | | ○ | | ○ | | | ○ |
| L | | | ○ | | | ○ | | ○ | | ○ |

HYDRAULIC PRESSURE CONTROL SYSTEM OF AN AUTOMATIC TRANSMISSION FOR VEHICLE

BACKGROUND OF THE INVENTION

1. Field of the Invention

The present invention relates to the hydraulic control system of an automatic transmission for a vehicle and, more particularly, to hydraulic control system for a four-speed automatic transmission which can enhance shift quality by alleviating shock caused by gear shifting and can improve responsiveness with respect to the gear shifting.

2. Description of Related Art

In general, an automatic transmission provides a necessary gear ratio to operate the vehicle under wide range of speeds and loads. It does this with a minimum amount of effort on the part of the driver. That is, automatic upshifts and downshifts are a convenience for the driver because a foot-operated clutch is not required to shift gears and because the vehicle can be brought to a stop without the use of a clutch and without shifting the transmission into neutral.

A conventional automatic transmission for a vehicle comprises a torque converter having an impeller, a turbine and a stator, a gear train connected to the torque converter to provide various forward speed ranges and reverse, a plurality of friction members such as disc clutches, one-way clutches which control gear action, and a hydraulic control system for controlling the operation of the friction members.

Figure 7:
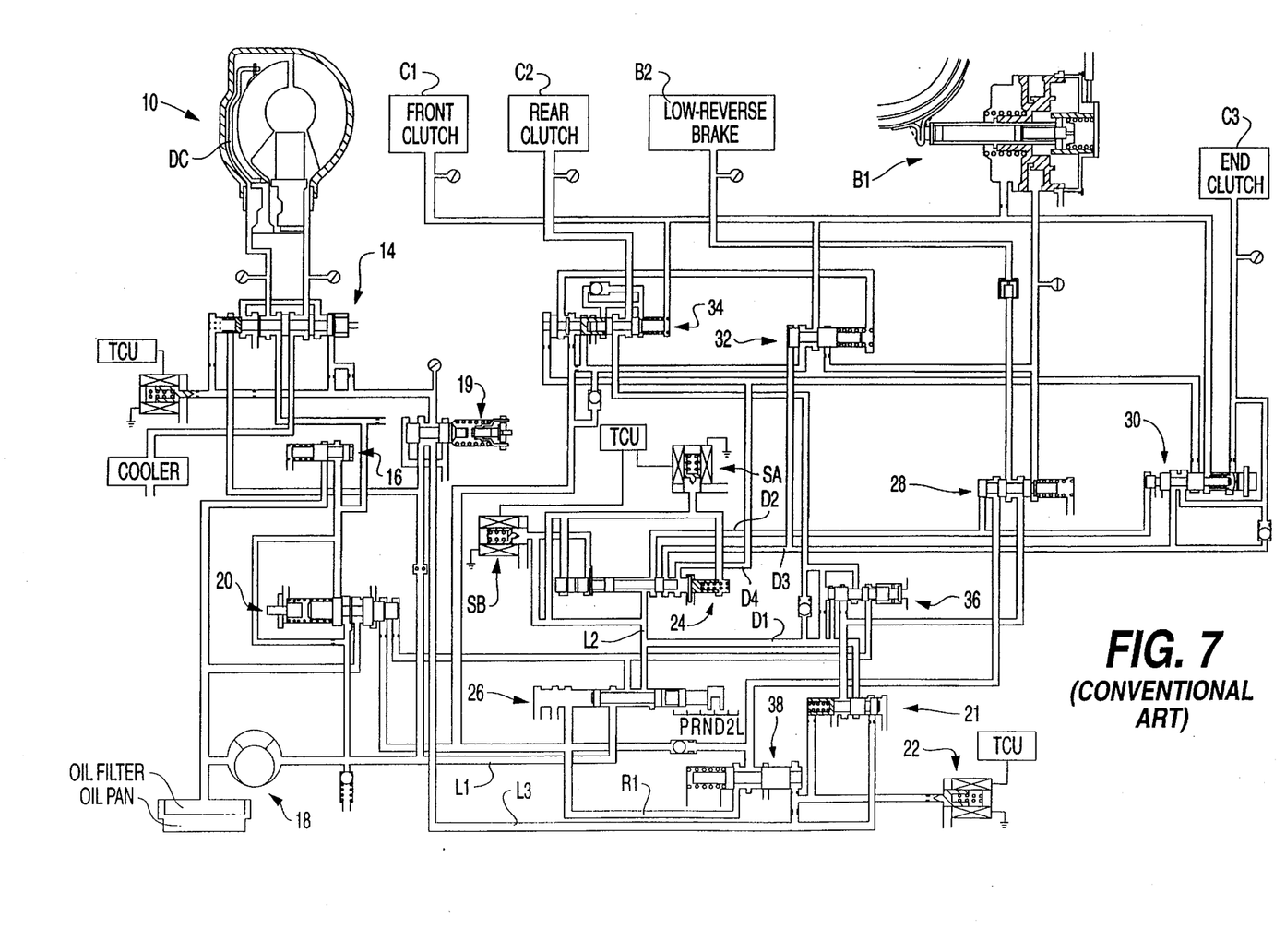
FIG. 7 is a view showing a hydraulic pressure control system in accordance with a conventional automatic transmission.

One example of a conventional hydraulic pressure control system of an automatic transmission is illustrated in FIG. 7. The conventional hydraulic control system comprises a damper clutch control valve 14 for controlling the operation of a damper clutch DC mounted inside torque converter 10 to increase power train efficiency, pressure regulator valve 20 for regulating a hydraulic pressure generated from hydraulic pump 18 according to the automatic transmission requirements, and reducing valve 19 for feeding a stable pressure to solenoid valve 12 and the damper clutch control valve 14.

Manual valve 26, which is connected to an outlet of hydraulic pump 18 to receive line pressure therefrom, is designed to deliver a line pressure to the pressure regulator valve 20 and shift control valve 24. The manual valve 26 moves in accordance with a position(range) of a shift selector lever having five positions(ranges) P, R, N, D, 2 and L.

Shift control valve 24, which is actuated in response to two shift control solenoid valves SA and SB controlled by transmission control unit TCU, is designed to feed hydraulic pressure selectively through a first-to-second speed shift valve 28, end clutch valve 30, second-to-third and third-to-fourth speed shift valve 32, and rear clutch exhaust valve 34 to a front clutch C1, a rear clutch C2, low-reverse brake B2, kick down servo band brake B1, and end clutch C3.

N-D control valve 36 for alleviating shock caused by shifting the shift selector lever from the neutral "N" range to the drive "D" range is connected to the rear clutch C2 via the rear clutch exhaust valve 34. N-R control valve 38 for reducing shock caused by shifting the shift selector lever from the neutral "N" range to the reverse "R" range is connected to low-reverse brake B2 via first-to-second speed shift valve 28.

Also, pressure control solenoid valve 22 is connected to pressure control valve 21 to reduce shock caused by gear shifting.

Shifting operation of this conventional hydraulic control system will be briefly described hereinafter.

When the drive "D" range is selected by the shift selector lever, hydraulic pressure generated from the hydraulic pump 18 is fed to the manual valve 26 along a line L1. The hydraulic pressure supplied to the manual valve 26 flows along lines L2 and D1.

In a first speed ratio at the drive "D" range, both of the shift control solenoid valves SA and SB are controlled to be "ON" by transmission control unit TCU, and therefore the hydraulic pressure flowing along line L2 is exhausted through each exit ports of shift control solenoid valves SA and SB to have no effect on the position of the valve spool of shift control valve 24. At the same time, pressure control solenoid valve 22 is controlled by transmission control unit TCU to be "ON" such that the hydraulic pressure flowing along line L3 via reducing valve 19 is exhausted through an exit ports of the pressure control solenoid valves 22.

Since the hydraulic pressure in the line D1 is not fed to the first-to-second speed shift valve 28, the hydraulic pressure flowing along the line D1 is supplied to rear clutch C2 via rear clutch exhaust valve 34 to apply the same.

In a second speed ratio at the drive "D" range, only the shift control solenoid valve SA is controlled by transmission control unit TCU to be "OFF" such that the hydraulic pressure is exhausted through shift control solenoid valve SB to thereby move the valve spool and plug of the shift control valve 24 rightward. As a result, the hydraulic pressure from the manual valve 26 flows along line D2.

Accordingly, the hydraulic pressure in line D2 is fed to the left side of first-to-second speed shift valve 28 to push the valve spool thereof rightward. At this point, since pressure control solenoid valve 22 is controlled to be "OFF" to prevent the hydraulic pressure from being exhausted, and thus the hydraulic pressure from the hydraulic pump 18 is supplied to the left side of pressure control valve 21 via reducing valve 19 to push the valve spool therein rightward. Accordingly, the hydraulic pressure passing through the line D1 is supplied to the first-to-second speed shift valve 28 via the pressure control valve 21.

At this point, since the valve spool of first-to-second speed shift valve 28 has been pushed rightward, the hydraulic pressure which has passed through pressure control valve 21 is supplied to an apply chamber of kick-down servo band brake B1 to apply the same, thereby accomplishing the second speed ratio.

In third speed ratio at the drive "D" range, because the transmission control unit TCU makes both of the shift control solenoid valves A and B switch "OFF", the hydraulic pressure is prevented from being exhausted. Thus, the valve spool of the shift control valve 24 is moved rightward farther and the valve plug is stopped by means of a stopper.

At this state, because lines D2 and D3 are opened simultaneously, a portion of the hydraulic pressure flowing along line D3 is fed to the right side of end clutch, valve 30 to push the valve plug leftward and is then fed to the end clutch C3 to apply the same. The other portion of the hydraulic pressure flowing along the line D3 is fed to the left side of second-to-third and fourth-to-third speed shift valve 32 to force the valve spool rightward.

Further, the hydraulic pressure passing through first-to-second speed shift valve 28 via pressure control valve 21 is fed to second-to-third and fourth-to-third speed shift valve 32. At this point, since the valve spool of second-to-third and fourth-to-third speed shift valve has been pushed rightward, a portion of the hydraulic pressure supplied to the secondto-third and fourth-to-third speed shift valve 32 is fed to a release chamber of kick down servo band brake B1 and another portion of the hydraulic pressure is fed to the front clutch C1.

Accordingly, the kick down servo band brake B1 which has been applied in tile second speed ratio is released and front clutch C1 is applied, thereby accomplishing the third speed ratio.

In a fourth speed ratio at the drive "D" range, because transmission control unit TCU makes only the shift control solenoid valve SB switch "OFF", the valve spool of shift control valve 24 moves rightward farther than it has been at the third speed ratio to open the fourth line D4. When this occurs, the hydraulic pressure supplied to the left side of the rear clutch exhaust valve 34 pushes the valve spool rightward to interrupt the hydraulic pressure for applying the front clutch C1 and the hydraulic pressure for releasing kick down servo band brake B1. Accordingly, kick down servo band brake B1 is applied again automatically and end clutch C3 remains in the applied state, thereby accomplishing the fourth speed ratio.

When the shift selector lever is set at the reverse "R" range, the hydraulic pressure from the manual valve 26 is supplied to the right side of second-to-third and fourth-to-third speed shift valve 11 via rear clutch exhaust valve 34 to force the valve spool leftward, and thus the hydraulic pressure from manual valve 26 is supplied to the front clutch C1 and the low reverse brake B2 and acts to release the kick-down servo band brake B1 to reverse the vehicle.

As described above, front clutch, rear clutch and end clutch C1, C2 and C3 respectively, are applied in the third speed ratio in the drive "D" range, and rear clutch and kick down servo band brake C2 and B1 are applied in the second speed ratio at the drive "D" range. Therefore, to accomplish a downshift from the third speed ratio to the second speed ratio, front clutch and end clutch C1 and C3 should be released. However, since the pressure applied front clutch C1 and to the release chamber of kick down servo band brake B1 flows along same line, the release pressure of front clutch C1 should be supplied at the time the apply pressure of the front clutch C1 is exhausted. If the apply pressure of front clutch C1 is not quickly exhausted, the apply pressure of kick down servo band brake B1 is fed to the kick down servo band brake such that the shift shock occurs. Complete of exhaustion of the apply pressure of front clutch C1 and supplying the apply pressure for the kick down servo band brake should be accomplished in 0.6 second. However, it is very difficult to control the friction members in turn in a such short time.

Additionally, since the conventional hydraulic control system as described above can not provide a skip shift, e.g. from the second speed ratio to the fourth speed ratio or from the fourth speed ratio to the second speed ratio, responsiveness with respect to a gear shift is retarded.

SUMMARY OF THE INVENTION

Therefore, it is an object of the present invention to provide a hydraulic pressure control system of an automatic transmission for a vehicle which can enhance a shift quality by alleviating shock caused by gear shifting.

It is another object of the present invention to provide a hydraulic control system which provides a skip shift between second speed to fourth speed.

To achieve the above objects, the present invention provides a hydraulic pressure control system of an automatic transmission for a vehicle, comprising: a damper clutch control part for controlling a damper clutch which increase power train efficiency; a pressure regulating part for regulating a hydraulic pressure generated from a hydraulic pump; and a shift control part for selectively supplying the hydraulic pressure regulated at the pressure regulating part to a plurality of friction members to applying more than one of friction members in accordance with each speed stage; wherein the shift control part comprises a first-to-second speed shift valve which operates in response to a second speed signal pressure and a second-to-third speed shift valve which operates in response to a third speed signal pressure, thereby alleviating a shift shock and enabling a skip shift from a second speed ratio to a fourth speed ratio and from a fourth speed ratio to a second speed ratio.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF A PREFERRED EMBODIMENT

A preferred embodiment of the present invention will now be described in detail with reference to the accompanying drawings.

Certain terminology will be used in the following description for convenience and reference only and will not be limiting. The words "right" and "left" will designate directions in the drawings to which reference is made.

As used herein a shift directly from fourth speed ratio to second speed ratio is a skip downshift wherein one speed ratio (i.e. 3nd speed ratio) is skipped and a shift directly from second speed ratio to fourth speed ratio is a skip upshift wherein one speed ratio (i.e. 3nd speed ratio) is skipped.

Figure 1:
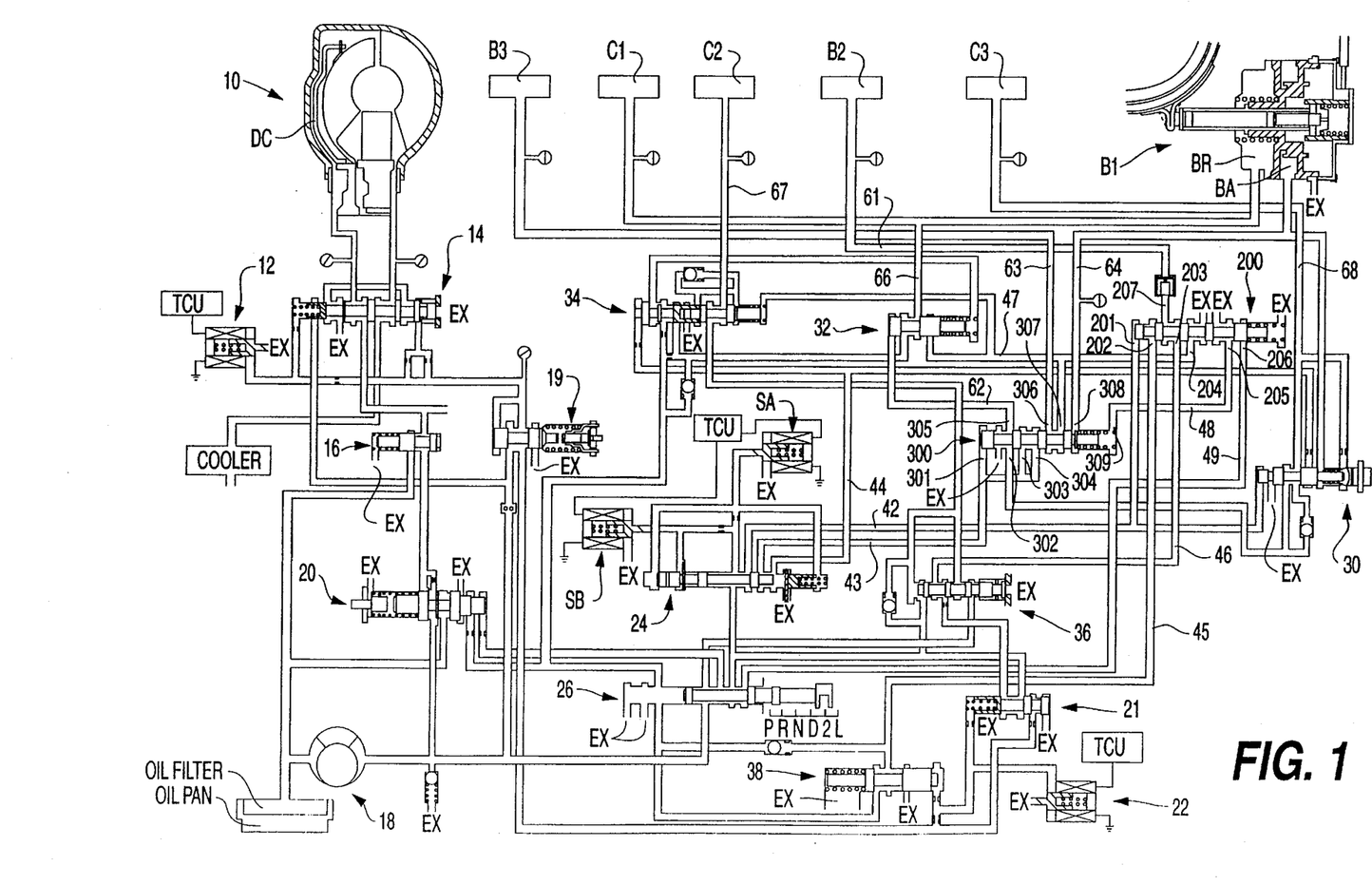
FIG. 1 is a view showing a hydraulic control system of an automatic transmission according to a preferred embodiment of the present invention.

FIG. 1 shows a hydraulic control system of an automatic transmission according to a preferred embodiment of the present invention. In this embodiment the same elements as those in the previously described reference numerals and the description thereof will be omitted.

The hydraulic control system comprises a damper clutch control part including a torque convertor 10 connecting an engine crankshaft to a transmission input shaft and damper clutch control solenoid and damper clutch valves 12 and 14 which control the operation of a damper clutch DC to increase power train efficiency.

The hydraulic control system further comprises a pressure control part including hydraulic pump 18 actuated by the torque converter 10 to generate hydraulic pressure, pressure regulator valve 20 for regulating the hydraulic pressure generated from hydraulic pump 18 as a line pressure in response to each shift range, reducing valve 19 for reducing the line pressure and supplying the reduced pressure to pressure control valve 21, N-R control valve 38 for preventing a shift shock occurring when the shift selector lever is shifted from a neutral "N" range to a fevers "R" range (or a parking "P" range to the reverse "R" range), N-D control valve 36 for preventing a shift shock occurring when the shift selector lever is shifted from the neutral "N" range to a drive "D" range, and manual valve 26 for supplying the line pressure to each valve or exhausting the line pressure through an exit port in response to a position of the shift selector lever.

The hydraulic control system further comprises a shift control part including shift control valve 24 controlled by two solenoid valves SA and SB to feed the hydraulic pressure in response to each speed ratio, end. clutch valve 30, first-to-second speed shift valve 200, second-to-third speed shift valve 300, second-to-third speed and fourth-to-third speed shift valve 32, and rear clutch exhaust valve 34 to which the hydraulic pressure is selectively fed in accordance with operation of shift control valve 24, and front, rear and end clutches C1, C2, and C3 and kick down servo band, low-reverse and 2nd brakes B1, B2, B3 which are selectively applied and released in accordance with positions of each valve.

Figure 2:
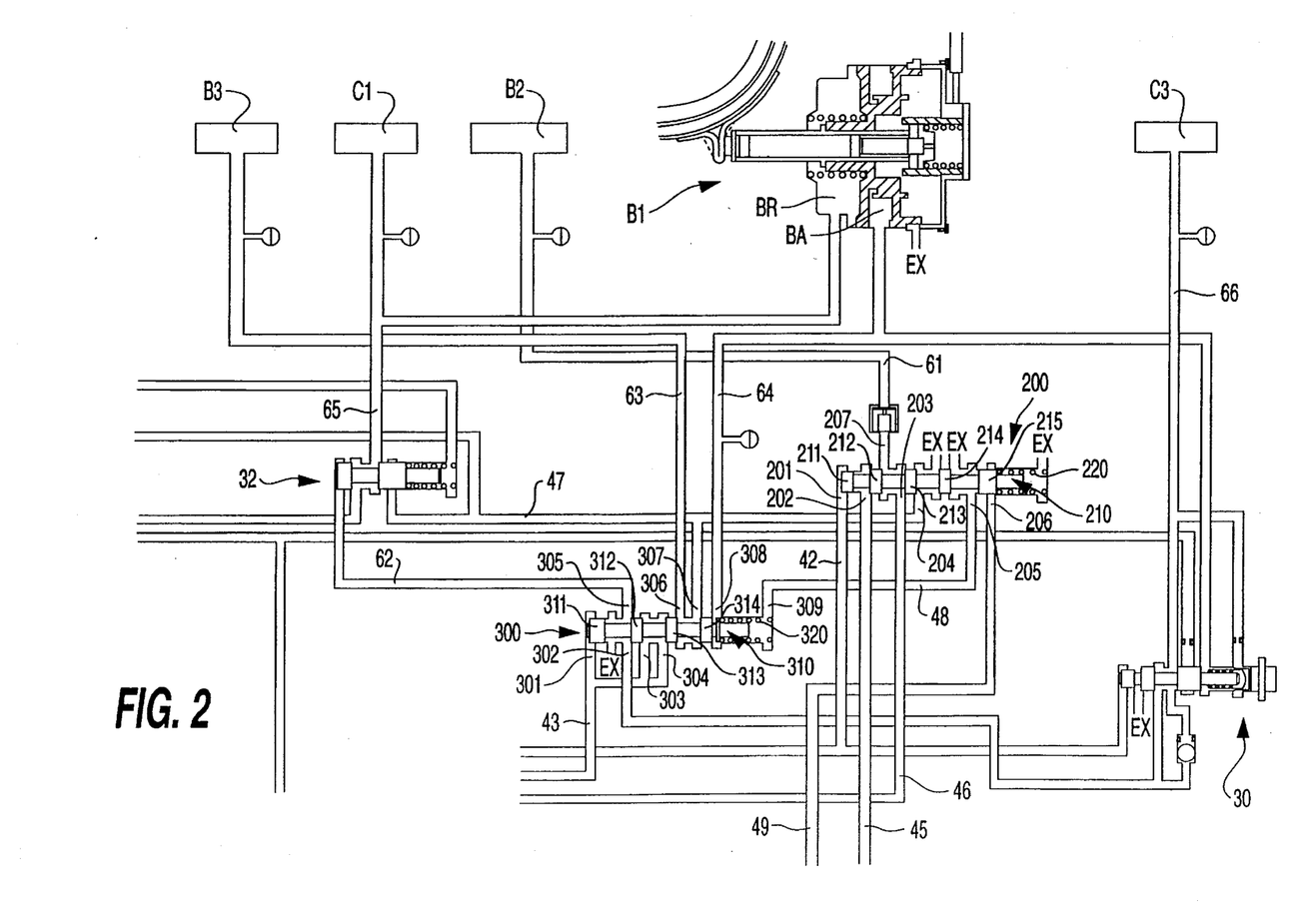
FIG. 2 is an enlarged view of the first-to-second shift valve and the second-to-third speed shift valve of the hydraulic control system depicted in FIG. 1.

FIG. 2 shows an enlarged view of first-to-second speed, shift valve 200 and second-to-third speed shift valve 300. First-to-second speed shift valve 200 is designed to supply hydraulic pressure to low-reverse brake B2 to apply the low-reverse brake B2 in the low "L" and reverse "R" ranges. The first-to-second speed shift valve is provided with first port 201 connected through line 42 with shift control valve 24 to receive a second speed signal pressure, second port 202 connected through a line 45 with the N-R control valve 38, third port 203 connected through line 46 with the N-D control valve 36, fourth port 204 connected to second-to-third and fourth-to-third speed shift valve 32 through line 47, fifth port 205 which is connected to the second-to-third speed shift valve 300 through line 48, sixth port 206 connected through line 49 with manual valve 26, and a seventh port 207 which is connected with the low-reverse brake B2 through line 61.

First-to-second speed shift valve 200 comprises valve spool 210 having first, second, third, fourth and fifth lands 211, 212, 213, 214 and 215 to selectively open and close the ports and spring 220 which forces the valve spool 210 leftward against the hydraulic pressure at port 201. In the first-to-second speed shift valve as described above, the second speed signal pressure at first port 201 acts on the left face of the first land 211 to push valve spool 210 rightward such that second land 212 having a section area larger than that of the first land 211 is displaced to open communication between second and seventh ports 202 and 207. As a result, the hydraulic pressure at second port 202 is fed to low reverse brake B2 through line 61, thereby applying low-reverse brake B2.

Third land 213 of valve 200 selectively communicates third and fourth ports 203 and 204 with each other to selectively supply the hydraulic pressure from N-D control valve 36 in line 46 to second-to-third and fourth-to-third speed shift valve 32. Fourth land 214 selectively opens and closes the adjacent exit ports. Fifth land 215 opens sixth port 206 in the second "2" and low "L" ranges so as to supply hydraulic pressure in line 49 to the second-to-third speed shift valve 300 through line 48 to apply the kick-down servo band brake B1.

Second-to-third speed shift valve 300 operated by a third speed signal pressure from shift control valve 24 is provided with first, third, fourth, ports 301, 303, 304 through which a third speed signal pressure is supplied from shift control valve 24 along a line 43, second port 302 connected to the end clutch valve 30, fifth port 305 connected through line 62 with the second-to-third and fourth-to third speed shift valve 32 for supplying the hydraulic pressure, sixth port 306 connected to the 2nd brake B3 through line 63 for supplying the hydraulic pressure thereto, seventh port 307 connected to fourth port 204 of first-to-second speed shift valve 200 and also to the second-to-third and fourth-to-third speed shift valve 32 through line 47, and eighth port 308 connected through line 64 with apply chamber BA of kick down servo band brake B1 to supply the hydraulic pressure thereto.

The second-to-third speed shift valve 300 comprises valve spool 310 having first, second, third and fourth lands 311, 312, 313 and 314 for selectively opening and closing the ports thereof and a spring 320 which forces the valve spool 310 leftward.

When the hydraulic pressure is fed from shift control valve 24 to first port 301 of second-to-third speed shift valve 300 along line 43 and acts on the left face of first land 311, valve spool 310 of second-to-third speed shift valve 300 moves rightward such that second land 312 communicates the third port 303 with the fifth port 305. Further, third land 313 communicates sixth port 306 with fourth port 304 to apply 2nd brake B3 and, fourth land 314 communicates eight port 308 with seventh port 307 to supply the hydraulic pressure at seventh port 307 to apply chamber BA of the kick down servo band brake B1.

Figure 3A:
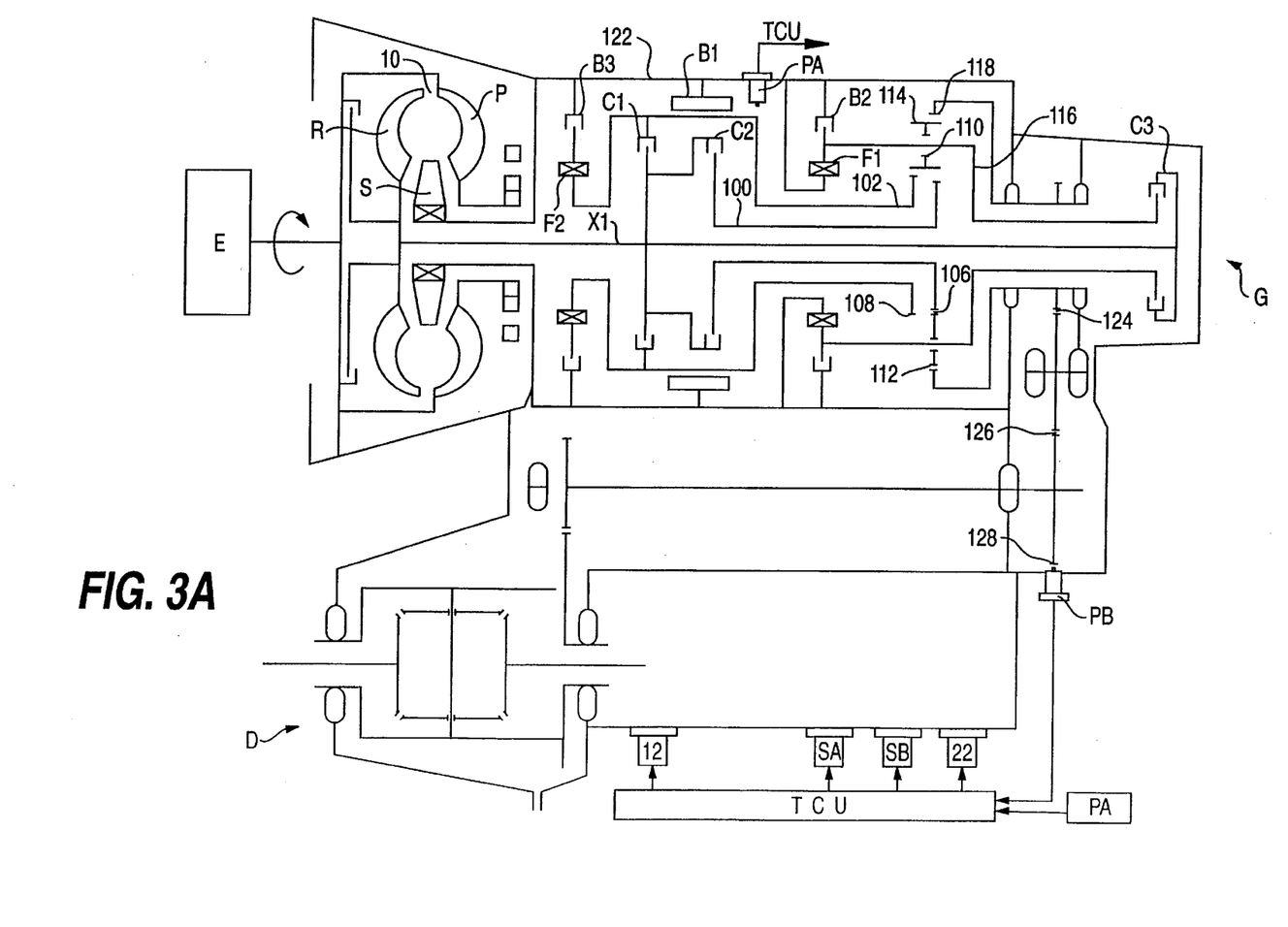
FIG. 3A is a schematic view showing a power train to which the hydraulic pressure control system of the present invention is adapted.
Figure 3B:
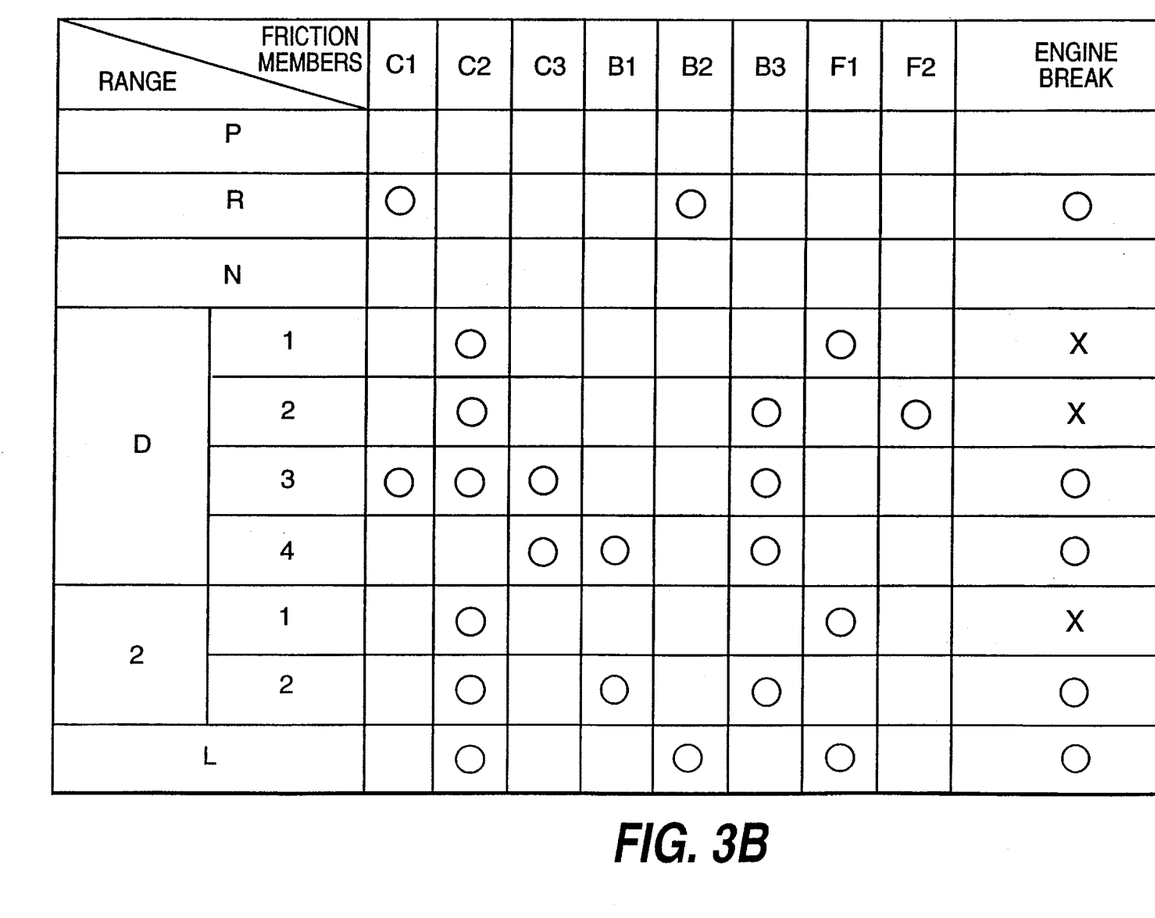
FIG. 3B is a table illustrating combination of frictional members at each speed ratio in the automatic transmission according to the present invention, respectively.

FIGS. 3A and 3B show a power train to which the hydraulic pressure control system of the present invention is adapted and a table illustrating combination of frictional members at each speed ratio of the 4-speed automatic transmission according to the present invention, respectively.

The power train comprises an engine E which is a power source, a torque converter 10 connected to a crankshaft of the engine E, a multiple stage gear mechanism having a planetary gear unit 110 which provides various forward speed ratios and reverse, and a transmission control unit TCU which receives a signal from two pulse generators PA and controls the solenoid valves 12, 22, SA and SB to properly supply the hydraulic pressure to each friction member.

The torque convertor 10 transmitting the power of the engine E to the multiple stage gear mechanism includes a pump impeller P attached to a front cover, a turbine runner R facing to the pump impeller P, and a stator disposed between the pump impeller P and the turbine runner R. Forward sun gear shaft 100 is disposed around input shaft X1 connected to turbine runner R and reverse sun gear shaft 102 is disposed around forward sun gear shaft 100. The planetary gear unit includes forward sun gear 106 rotatably carried on forward sun gear shaft 100 and reverse sun gear 108 rotatably mounted on reverse sun gear shaft 102.

Planetary gear unit 110 further includes a set of short pinions 112 directly meshing with forward sun gear 106 and a set of long pinion gears 114 directly meshing with the reverse sun gear 108. Short and long pinion gears 112 and 114 are carried on carrier 116 which is selectively drive by end clutch C3 mounted on a longitudinal end of input shaft X1. The long pinions mesh with a ring gear 118, which is integrally formed with carrier 116, and also with short pinions 112.

Front clutch C1 controlled by the hydraulic pressure control system transmits the driving force from input shaft X1 to reverse sun gear 108 to thereby accomplish third speed and reverse.

Rear clutch C2, which is applied in first, second and third speed ratios of the drive "D" range, transmits the driving force of the input shaft X1 to forward sun gear shaft 100 to drive forward sun gear 106. Kick down servo band brake B1 which is to be applied in the second speed ratio of the second "2" range and the fourth speed ratio at drive "D" range, controls the drive of the reverse sun gear shaft 102 to drive reverse sun gear 108.

Low-reverse brake B2, which is applied in the first speed ratio at the low "L" range and reverse "R" range, fixes carrier which is the shaft of short and long pinions 112 and 114 and connects first one way clutch F1 to carrier to prevent the carrier from rotating in a direction opposite to the engine.

Further, 2nd brake B3, which is applied in the second, third and fourth speed ratios of the drive "D" range and the second speed ratio at the second "2" range, is connected to reverse sun gear shaft 102 through second one way clutch F2 to restrict rotation of sun gear shaft 102 to the counterclockwise direction, as viewed from the engine side, such that no engine brake effect occurs.

Transfer drive gear 124 is carried by carrier 116 to transmit rotation force to transfer driven gear 128 through idler gear, thereby transmitting the driving force to a differential gear.

In the power train and hydraulic pressure control system as described above, the first speed ratio is accomplished in a same manner as that of the prior art illustrated in FIG. 7. That is, the hydraulic pressure generated from hydraulic pump 18 is fed to torque converter 10 and also to the reducing valve 19 to supply to the pressure control valve a hydraulic pressure lower than the line pressure. At this point, hydraulic pressure fed to the manual valve 26 is supplied to rear clutch exhaust valve 34, thereby applying rear clutch C2 and accomplishing the first speed ratio.

At this point, no hydraulic pressure acts on shift control valve 24 since both of shift control solenoid valves SA and SB are controlled to be "ON" by the transmission control unit TCU.

Figure 4:
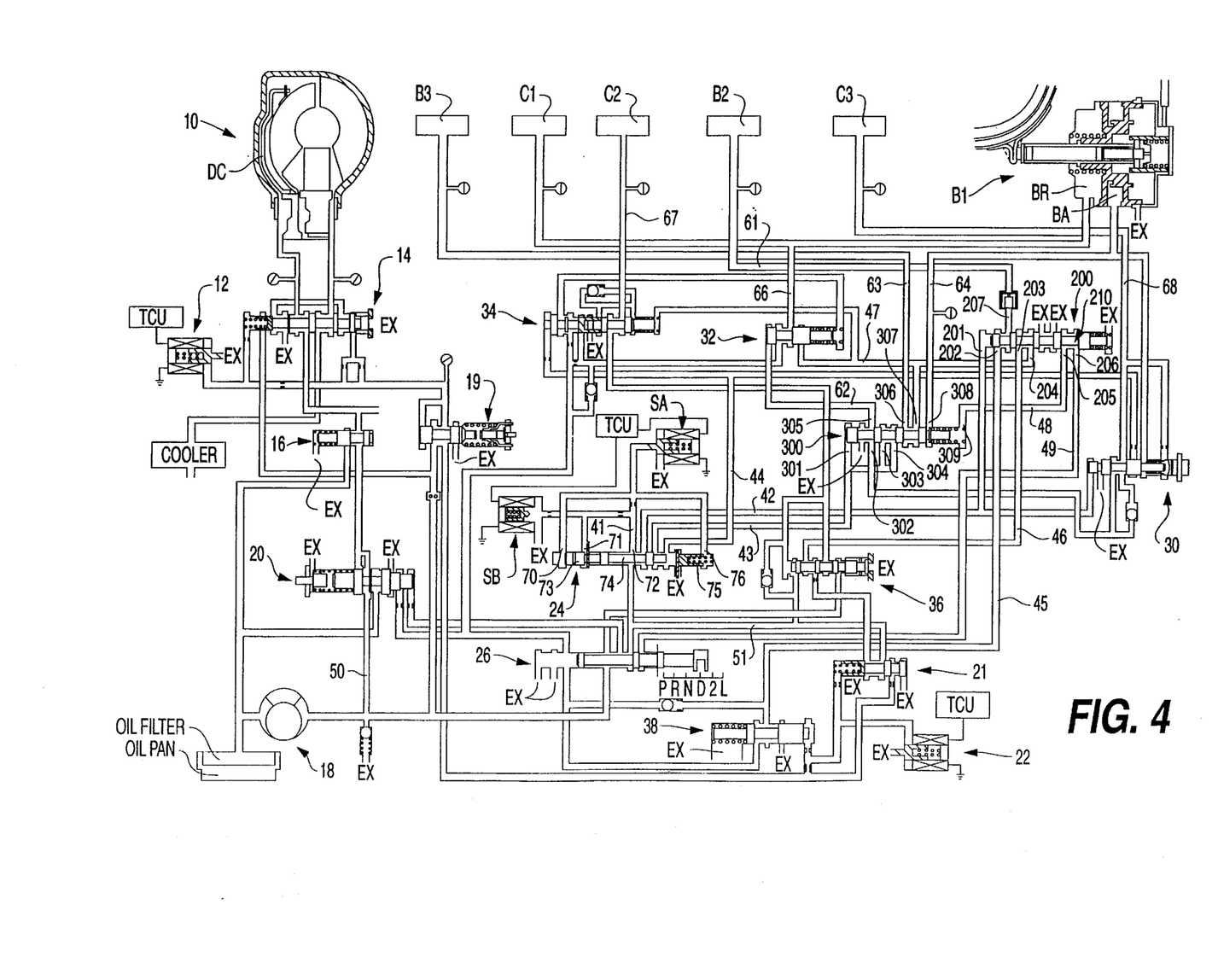
FIG. 4 is a view showing the location of hydraulic pressure when the hydraulic control system in accordance with the present invention is in the second speed of the drive "D" range.

FIG. 4 shows the location of the hydraulic pressure in the second speed ratio at the drive "D" range of the hydraulic control system in accordance with the present invention.

In the second speed ratio at the drive "D" range, shift control solenoid valve SA is controlled to be "OFF" by the transmission control unit TCU while shift control solenoid valve SB keeps the "ON" state such that the hydraulic pressure is fed to shift control valve 24 through its ports 70 and 76. Accordingly, right plug 75 moves to a stopper and left plug 73 moves rightward while pushing a middle valve 74 rightward. As a result, the second speed signal pressure flows into first port 201 of first-to-second speed shift valve 200 through line 42 and acts on the left face of first land 211 and also on the left side of end clutch valve 30. Further, since the valve spool of N-D control valve 36 has been moved rightward in the first speed ratio, a portion of the hydraulic pressure supplied from manual valve 26 to the left side of N-D control valve 36 along line 51 is fed to rear clutch C2 through the rear clutch exhaust valve 34, thereby applying the rear clutch C2. And, since the hydraulic pressure which is duty controlled by solenoid valve 22 forces the valve spool of pressure control valve 21 rightward, the other portion of the hydraulic pressure flowing along line 51 is supplied to third port 203 of first-to-second speed shift valve 200 via N-D control valve 36.

At this point, since valve spool 210 of first-to-second speed shift valve 200 has been moved rightward, the hydraulic pressure supplied to third port 203 is fed to seventh port 307 of second-to-third speed shift valve 300 through the fourth port 204 and then through sixth port 306 to the 2nd brake B3 along the line 63, thereby applying 2nd brake B3 and accomplishing the second speed ratio.

Figure 5:
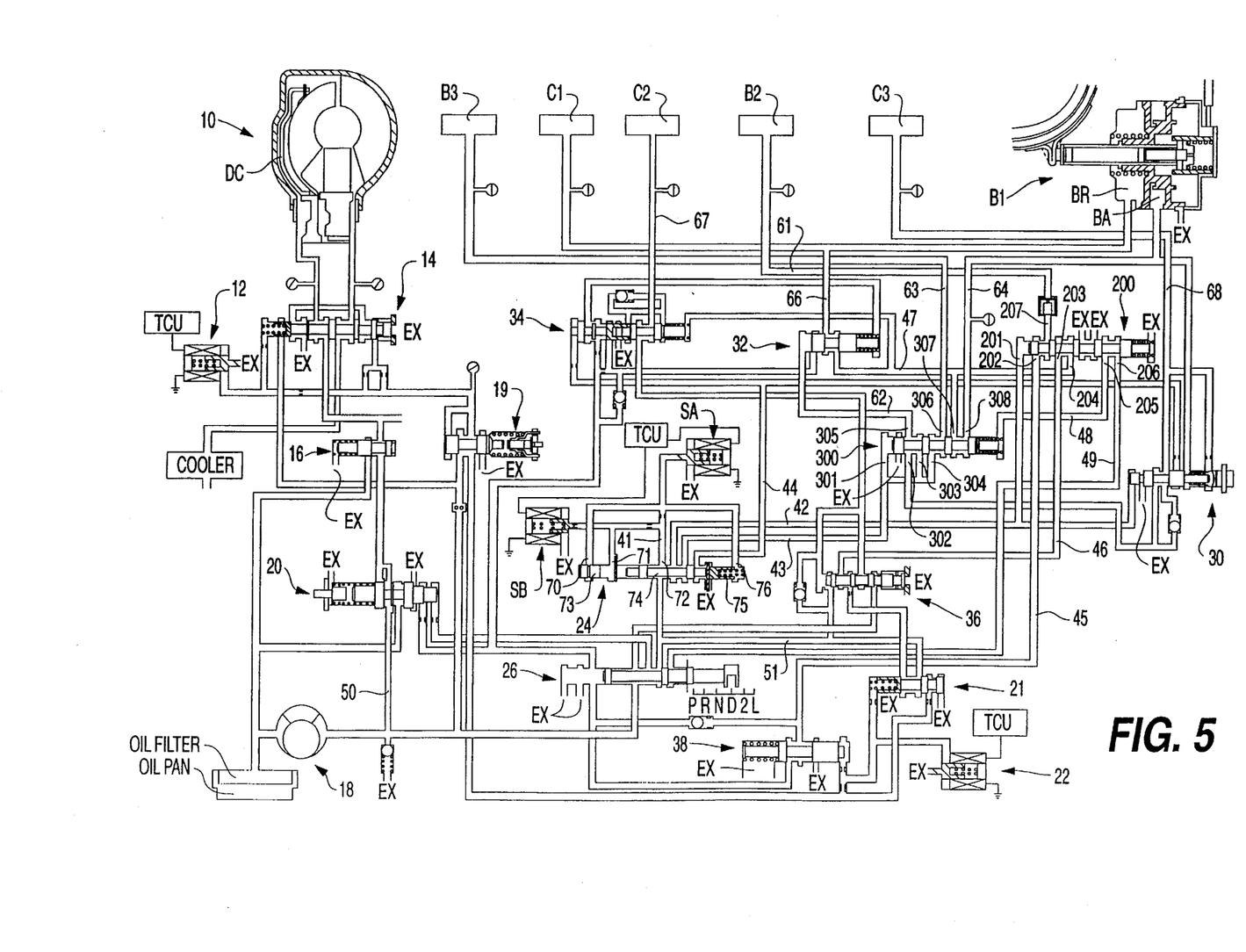
FIG. 5 is a view showing the location of hydraulic pressure when the hydraulic control system in accordance with the present invention is in the third speed of the drive "D" range.

In the third speed ratio of drive "D" range, as shown in FIG. 5, since both solenoid valves SA and SB are controlled to be "OFF" by transmission control unit TCU, hydraulic pressure is supplied to ports 70 and 76 of shift control valve 24 such that left and right plugs 73 and 75 are forced toward each stopper and middle valve 74 is moved rightward by the hydraulic pressure supplied through first port 71, whereby the third speed signal pressure is fed to first, third and fourth ports 301, 303 and 304 of second-to-third speed shift valve 300 along the line 43. As a result, valve spool 310 of second-to-third speed shift valve 300 moves rightward such that the hydraulic pressure at third port 303 is supplied through fifth port 305 to the left side of second-to-third and fourth-to-third speed shift valve 32 along the line 62 and, at the same time, the hydraulic pressure at second port 302 is fed to end clutch valve 30. Further, the hydraulic pressure flowed into through fourth port 304 is fed to 2nd brake B3 through sixth port 306 to apply the same. A portion of the hydraulic pressure duty-controlled at pressure control valve 21 controlled by pressure control solenoid valve 22 is fed to third port 203 of first-to-second speed shift valve 200 via N-D control valve 36 along line 46 and then supplied to front clutch C1 and release chamber of kick down servo band brake B1 via second-to-third and fourth-to-third speed shift valve 32. Further, another portion of the hydraulic pressure at fourth port 204 of first-to-second speed shift valve 220 is fed to the apply chamber BA of kick down servo band brake B1 via the second-to-third speed shift valve 300 for preparing a fourth speed ratio and the other portion of the hydraulic pressure is supplied to end clutch valve 30 to move the valve spool thereof leftward such that the hydraulic pressure which has been fed thereto from second-to-third speed shift valve 300 is fed to end clutch C3 along the line 68 to apply the same.

Figure 6:
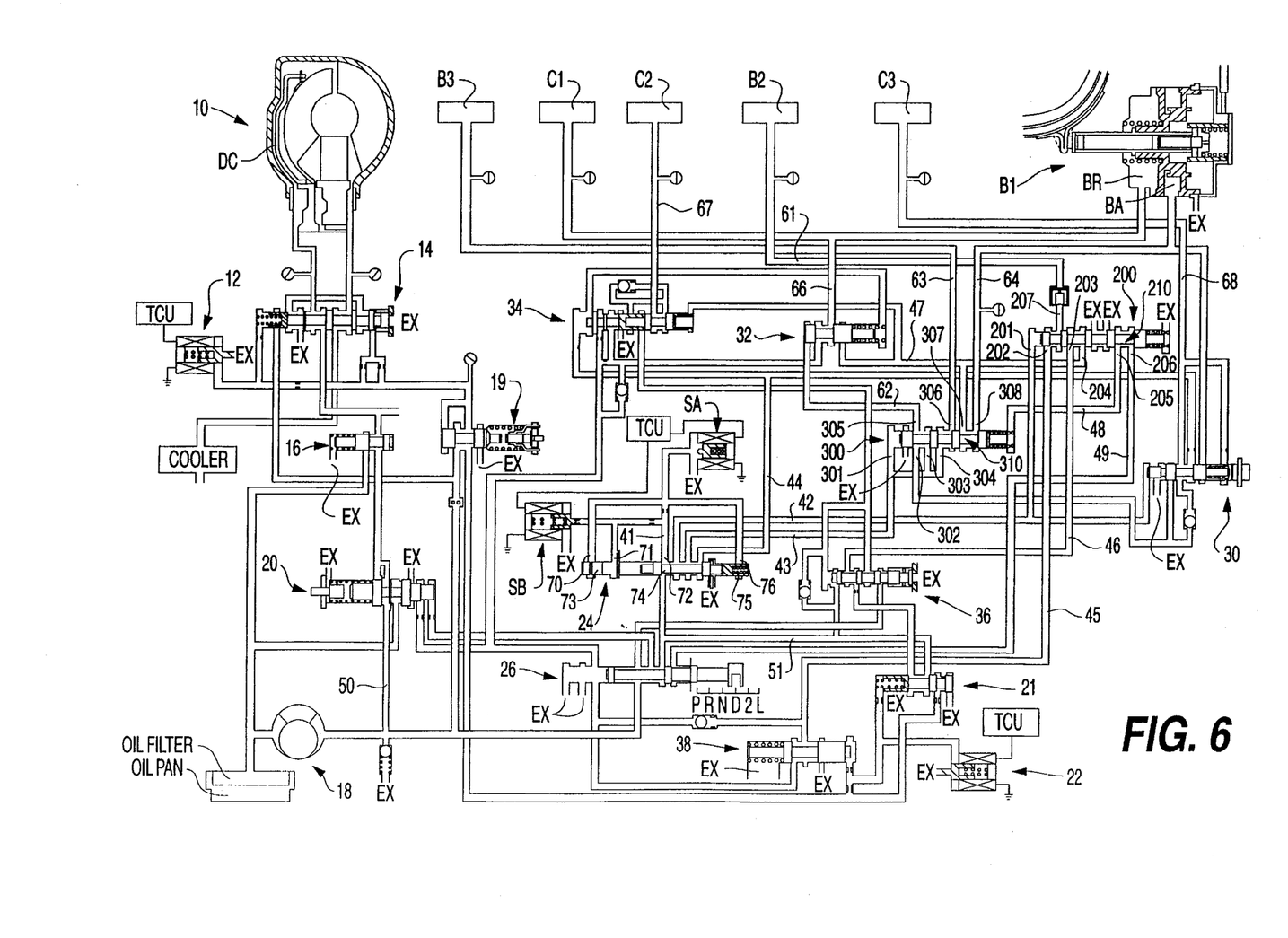
FIG. 6 is a view showing the location of hydraulic pressure when the hydraulic control system in accordance with the present invention is in the fourth speed of the drive "D" range.

In the fourth speed ratio at the drive "D" range, as shown in FIG. 6, since shift control solenoid valve SA is controlled to be "ON" by the transmission control unit TCU while shift control solenoid valve SB keeps its OFF state, the hydraulic pressure is not fed to ports 70 and 76 of shift control valve 24 but to first port 71. As a result, the fourth speed signal pressure acts on the left side of rear clutch exhaust valve 34 along line 44 to thereby force the valve spool rightward and, at the same time, acts on the right side of second-to-third and fourth-to-third speed shift valve 32. As a result, the hydraulic pressure which has been supplied to the rear clutch C2 along line 67 via N-D control valve 36 and rear clutch exhaust valve 34 is exhausted through the exit port of rear clutch exhaust valve 34.

Further, since the valve spool of second-to-third and fourth-to-third speed shift valve 32 moves leftward to interrupt the hydraulic pressure which is supplied from second-to-third speed shift valve, the hydraulic pressure which has been supplied from second-to-third and fourth-to-third speed shift valve 32 to front clutch C1 and release chamber BR of kick down servo band brake B1 along line 66 is exhausted through the exit port of the manual valve 26. At this point, since the hydraulic pressure which is duty controlled at pressure control valve 21 by pressure control solenoid valve 22 and supplied to apply chamber BA of kick down servo band brake B1 via N-D control valve 36, first-to-second speed shift valve 200 and second-to-third speed shift valve 300 is not exhausted such that kick down servo band brake B1 keeps its application state.

In skip downshift from the fourth speed ratio to the second speed ratio, since shift control solenoid valve SA is controlled to be "OFF" while shift control solenoid valve SB is controlled to be "ON", the valve spool of shift control valve 24 is displaced to the same position as in second speed ratio such that the third and fourth speed signal pressures are exhausted through an exit port such that valve spool 310 of second-to-third speed shift valve 300 is forced leftward by spring 320. As a result, the hydraulic pressure which is to be fed to the front clutch C1 through second-to-third and fourth-to-third speed shift valve 32 is interrupted, thereby releasing front clutch C1. And, at the same time, the hydraulic pressure controlled by pressure control solenoid valve 22 is supplied to the right side of rear clutch exhaust valve 34 to determine the actuating timing. And the hydraulic pressure acting on end clutch C3 is exhausted by the control of shift control valve 24. At this point, 2nd brake B3 is applied by the hydraulic pressure as illustrated in FIG. 5, thereby accomplishing the second speed ratio.

In skip upshift from the second speed ratio to the fourth speed ratio, shift control solenoid valve SA is controlled to be "ON" by the transmission control unit TCU while shift control solenoid valve SB is controlled to be "OFF" such that the valve spool of the shift control valve 24 moves to the position as described in the fourth speed ratio. Accordingly, the hydraulic pressure is to flow along lines 43 and 44. And the hydraulic pressure in the line 44 is fed to the left side of rear clutch exhaust valve 34 to force the valve spool rightward. At this point, the hydraulic pressure acting on rear clutch C2 is exhausted through the exhaust port of rear clutch exhaust valve 34. Further, the hydraulic pressure in the line 43 is fed to second-to-third shift valve 300 through first port 301 to force valve spool 310 rightward.

Accordingly, second-to-third speed shift valve 32 interrupts the hydraulic pressure supplied from line 47 and, at this point, the hydraulic pressure flowing along the line 46 from pressure control valve 21 flows into first-to-second speed shift valve 200 through third port 203, out through fourth port 204, and then to second-to-third speed shift valve 300 through seventh port 307. And then the hydraulic pressure fed to second-to-third speed shift valve 300 is supplied to apply chamber BA of kick down servo band brake B1 through eighth port 308.

At this point, a portion of the hydraulic pressure supplied to apply chamber BA of kick down servo band brake B1 is supplied to end clutch valve 30 to act on the plug.

By this operation, the hydraulic pressure in line 43 is supplied to end clutch C3 via second-to-third speed shift valve 300 and end clutch valve 30, thereby accomplishing the fourth speed ratio.

According to the present invention, in the second speed ratio at the second "2" range, engine brake effect can be obtained. That is, in the second "2" range, the hydraulic pressure is fed to sixth port 206 of first-to-second speed shift valve 200 from manual valve 26 through line 49. At this point, since valve spool 210 of first-to-second speed shift valve 200 has been moved rightward, hydraulic pressure flowing into through sixth port 206 is fed to ninth port 309 of second-to-third speed shift valve 300 along line 48 to thereby push valve spool 310 leftward. As a result, eighth and ninth ports 308 and 309 of second-third speed shift valve 300 communicate with each other such that the hydraulic pressure is fed to apply chamber BA of kick down servo band brake B1 along line 64.

Accordingly, in second speed ratio at the second "2" range, kick down servo band brake B1 is applied in addition to the friction members which are applied in the second speed ratio at the drive "D" range, thereby obtaining the engine brake effect.

The shift operation in the low "L" range and the reverse "R" range is accomplished in accordance with the combination of the friction members as shown in FIG. 3B and the formation of the hydraulic pressure is same as that of the conventional hydraulic pressure control system as illustrated in FIG. 7. Thus, description thereof is omitted.

While this invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A 4-speed automatic transmission for a vehicle, comprising:

a multiple stage gear mechanism driven by an engine;

a plurality of friction members for controlling a gear action of the gear mechanism;

a hydraulic pressure control system for selectively applying and releasing the friction members in accordance with a vehicle speed; and a transmission control unit for controlling an operation of the hydraulic pressure control system; wherein the hydraulic pressure control system comprises:

a first-to-second speed shift valve actuated in accordance with a second speed signal pressure and selectively applying more than one of the friction members; and a second-to-third speed shift valve actuated in accordance with a third speed signal pressure.

2. The 4-speed automatic transmission according to claim 1 wherein the first-to-second speed shift valve comprises a plurality of ports, a valve spool having a plurality of lands to selectively open and close the ports, and a spring disposed at one end to bias the valve spool against the hydraulic pressure at the opposite end.

3. The 4-speed automatic transmission according to claim 1 wherein the second-to-third speed shift valve comprises a plurality of ports, a valve spool having a plurality of lands to selectively open and close the ports, and a spring disposed at one end to bias the valve spool against the hydraulic pressure at the opposite end.

4. The 4-speed automatic transmission according to claim 1 wherein the first-to-second speed shift valve further comprises a line for directly receiving hydraulic pressure from a manual valve in second "2" and low "L" ranges and a line for supplying hydraulic pressure to a kick down servo band brake via the second-to-third speed shift valve.

5. The 4-speed automatic transmission according to claim 1 further comprising a 2nd brake which is applied by hydraulic pressure supplied from the second-to-third speed shift valve in second, third and fourth speed ratios.

6. A hydraulic pressure control system of an automatic transmission for a vehicle, comprising:

a damper clutch control part for controlling a damper clutch to increase power train efficiency;

a pressure regulating part for regulating hydraulic pressure generated from a hydraulic pump; and a shift control part for selectively supplying hydraulic pressure regulated at the pressure regulating part to a plurality of friction members for applying more than one of the friction members in accordance with each speed ratio; wherein the shift control part comprises a first-to-second speed shift valve responsive to a second speed signal pressure and a second-to-third speed shift valve responsive to a third speed signal pressure, thereby alleviating a shift shock and enabling a skip shift from a second speed ratio to a fourth speed ratio and from a fourth speed ratio to a second speed ratio.

7. The hydraulic pressure control system according to claim 6 wherein the shift control part further comprises an end clutch valve, a second-to-third speed and fourth-to-third speed shift valve, a rear clutch exhaust valve, a shift control valve and two solenoid valves controlling the shift control valve to selectively supply the hydraulic pressure to the valves in response to each speed ratio, and wherein the friction members comprises a front clutch, an end clutch, a kick down servo band brake, a low-reverse brake and a 2nd brake, each being connected to the valves for selectively application and release in accordance with positions of each valve.

8. The hydraulic pressure control system according to claim 7 also including a manual valve responsive to a shift lever, a N-R control valve and a N-D control valve and wherein the first-to-second speed shift valve has a first port connected to receive a second speed signal pressure from the shift control valve, a second port connected to receive hydraulic pressure from the N-R control valve, a third port connected to receive hydraulic pressure from the N-D control valve, a fourth port connected to the second-to-third and fourth-to-third speed shift valve, a fifth port connected to the second-to-third speed shift valve, a sixth port connected to receive hydraulic pressure from the manual valve when the shift selector lever is set at second "2" and low "L" ranges, and a seventh port connected to supply hydraulic pressure to the low-reverse brake.

9. The hydraulic pressure control system according to claim 8 wherein the first-to-second speed shift valve further comprises a valve spool having first, second, third, fourth and fifth lands for selectively opening and closing the ports and a spring disposed to bias the valve spool against pressure received at the first port.

10. The hydraulic pressure control system according to claim 7 wherein the second-to-third speed shift valve is provided with first, second, third ports connected to receive a third speed signal pressure from the shift control valve, a fourth port connected to the end clutch valve, a fifth port connected to supply hydraulic pressure to the second-to-third and fourth-to-third speed shift valve, a sixth port connected to supply hydraulic pressure to the 2nd brake, a seventh port connected to the first-to-second speed shift valve and the second-to-third and fourth-to-third speed shift valve, and an eighth port connected to supply hydraulic pressure to an apply chamber of the kick down servo band brake.

11. The hydraulic pressure control system according to claim 10 wherein the second-to-third speed shift valve comprises a valve spool having first, second, third and fourth lands for selectively opening and closing the ports and a spring disposed to bias the valve spool against the third speed signal pressure.

\* \* \* \* \*

UNITED STATES PATENT AND TRADEMARK OFFICE
CERTIFICATE OF CORRECTION

PATENT NO.: 5,536,216

DATED: July 16, 1996

INVENTOR(S): Jaeduk JANG

It is certified that an error appears in the above-identified patent and that said Letters Patent is hereby corrected as shown below:

Claim 5, col. 11, line 8, "2nd" should read --second--.

Calim 7, col. 11, line 37, "member comprises" should read --members comprise--;

line 38, "2nd" should read --second--;

line 39, "selectively" should read --selective--.

Claim 10, col. 12, line 28, "2nd" should read --second--.

Signed and Sealed this

Nineteenth Day of November, 1996

Attest:

BRUCE LEHMAN

Attesting Officer     Commissioner of Patents and Trademarks